United States Patent
Chen et al.

(10) Patent No.: US 12,267,220 B2
(45) Date of Patent: Apr. 1, 2025

(54) AVAILABLE UPTIME MONITORING

(71) Applicant: Roblox Corporation, San Mateo, CA (US)

(72) Inventors: Chris Chen, San Mateo, CA (US); Brad Johanson, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 18/242,958

(22) Filed: Sep. 6, 2023

(65) Prior Publication Data

US 2024/0080253 A1    Mar. 7, 2024

Related U.S. Application Data

(60) Provisional application No. 63/404,369, filed on Sep. 7, 2022.

(51) Int. Cl.
| | |
|---|---|
| *G06F 15/173* | (2006.01) |
| *H04L 43/045* | (2022.01) |
| *H04L 43/067* | (2022.01) |
| *H04L 43/0817* | (2022.01) |

(52) U.S. Cl.
CPC ........ *H04L 43/0817* (2013.01); *H04L 43/045* (2013.01); *H04L 43/067* (2013.01)

(58) Field of Classification Search
CPC .. H04L 43/0817; H04L 43/045; H04L 43/067
USPC ........................................................ 709/224
See application file for complete search history.

(56) References Cited

U.S. PATENT DOCUMENTS

| | | | | |
|---|---|---|---|---|
| 5,910,803 | A * | 6/1999 | Grau ................... | H04L 41/22 709/224 |
| 6,631,409 | B1 * | 10/2003 | Watson ................ | H04L 43/00 709/224 |
| 6,738,811 | B1 * | 5/2004 | Liang .................. | H04L 41/147 709/224 |
| 6,789,112 | B1 * | 9/2004 | Freeman .............. | G06F 9/5011 709/224 |
| 6,874,106 | B2 * | 3/2005 | Suzuyama ........... | H04L 51/00 714/48 |
| 7,152,185 | B2 * | 12/2006 | Srivastava ........... | G06F 11/326 714/24 |
| 7,233,989 | B2 * | 6/2007 | Srivastava ........... | G06F 11/326 709/224 |

(Continued)

*Primary Examiner* — Alicia Baturay
(74) *Attorney, Agent, or Firm* — IP Spring

(57) ABSTRACT

Some implementations relate to methods, systems, and computer-readable media for detection and monitoring of available uptime which measures both how accessible a computer system is and how well it is functioning. In some implementations, a computer-implemented method includes determining a number of health check ping responses to a health check ping that are received from a computer system during an allotted timeframe, determining a number of non-error responses measured by the computer system during the allotted timeframe, aggregating the number of health check ping responses and the number of non-error responses to determine a number of partially to fully functioning periods associated with the computer system over a larger time interval, and outputting a system health metric based upon overall functionality of the system over the larger time interval.

19 Claims, 8 Drawing Sheets

(56) References Cited

U.S. PATENT DOCUMENTS

| | | | | |
|---|---|---|---|---|
| 7,287,075 B2* | 10/2007 | Srivastava | ............ | G06F 11/326 709/224 |
| 7,360,121 B2* | 4/2008 | Srivastava | .......... | G06F 11/3082 714/47.3 |
| 7,360,122 B2* | 4/2008 | Srivastava | .......... | G06F 11/3055 714/47.3 |
| 7,373,556 B2* | 5/2008 | Srivastava | .......... | G06F 11/0709 714/47.1 |
| 7,555,675 B2* | 6/2009 | Smith | ................ | G06F 11/2294 714/25 |
| 7,607,040 B2* | 10/2009 | Barlow | ............... | G06F 11/2028 714/25 |
| 7,672,247 B2* | 3/2010 | Gonzalez | ............ | H04L 41/0661 709/224 |
| 8,059,667 B2* | 11/2011 | Lean | .................. | H04M 3/4217 370/352 |
| 8,161,323 B2* | 4/2012 | Kuchibhotla | ....... | G06F 11/0748 714/48 |
| 9,019,123 B2* | 4/2015 | Boulanger | ............... | H04Q 9/00 340/870.03 |
| 9,146,798 B2* | 9/2015 | Gupta | ................ | G06F 11/0763 |
| 9,256,506 B1* | 2/2016 | Taylor | ................ | G06F 11/3006 |
| 9,323,924 B1* | 4/2016 | Roundy | ................ | G06F 21/577 |
| 9,432,310 B1* | 8/2016 | Shusterman | ........ | H04L 43/0811 |
| 9,626,262 B1* | 4/2017 | Vogel | ................ | G06F 11/2028 |
| 9,886,338 B1* | 2/2018 | Khokhar | ................ | G06F 11/34 |
| 9,928,258 B2* | 3/2018 | Kripalani | ............ | G06F 11/1456 |
| 10,033,603 B2* | 7/2018 | Gurdasani | ........... | G06F 11/3055 |
| 10,044,629 B1* | 8/2018 | Raftery | .................. | H04L 47/70 |
| 10,102,101 B1* | 10/2018 | Velaga | ............... | H04L 41/5009 |
| 10,476,951 B2* | 11/2019 | Gakhar | ............... | H04L 41/0856 |
| 10,542,071 B1* | 1/2020 | Matthews | ............... | H04L 67/02 |
| 10,572,292 B2* | 2/2020 | Bhandari | ................ | G06F 9/455 |
| 10,578,657 B2* | 3/2020 | Decamp | ................ | G05B 15/02 |
| 10,645,181 B2* | 5/2020 | Hoffner | ................ | H04L 67/55 |
| 10,663,498 B2* | 5/2020 | Decamp | ................ | G01R 21/133 |
| 10,754,720 B2* | 8/2020 | Mahindru | ............ | G06F 11/3495 |
| 10,833,971 B1* | 11/2020 | Hari Krishnan | .... | H04L 67/1034 |
| 10,965,566 B2* | 3/2021 | Nayak | ................ | H04L 41/0806 |
| 10,986,173 B1* | 4/2021 | Thomason | .......... | H04L 67/1021 |
| 11,010,191 B1* | 5/2021 | Hornbeck | ............. | H04L 67/133 |
| 11,023,301 B1* | 6/2021 | Hornbeck | ................ | G06F 8/63 |
| 11,108,673 B2* | 8/2021 | Kludy | ................. | G06F 11/3055 |
| 11,184,434 B2* | 11/2021 | Gakhar | ............... | H04L 41/0668 |
| 11,216,265 B1* | 1/2022 | Hornbeck | ............. | G06F 9/5072 |
| 11,222,726 B2* | 1/2022 | Cannell | .................... | H04W 4/80 |
| 11,231,448 B2* | 1/2022 | DeCamp | ............... | G01R 22/063 |
| 11,337,150 B2* | 5/2022 | Zhang | ............... | H04W 52/0216 |
| 11,343,166 B2* | 5/2022 | Kotadia | .................. | H04L 43/12 |
| 11,470,535 B1* | 10/2022 | Thomason | ............ | H04L 67/02 |
| 11,528,323 B1* | 12/2022 | Thomason | ........... | H04L 67/01 |
| 11,550,677 B2* | 1/2023 | Butucea Panait | ..... | G06F 16/273 |
| 11,579,914 B2* | 2/2023 | Bhandari | ................. | G06T 1/20 |
| 11,606,279 B2* | 3/2023 | Bandi | .................. | H04L 9/0825 |
| 11,698,843 B2* | 7/2023 | Sangala | ............. | G06F 11/2056 714/6.3 |
| 11,709,725 B1* | 7/2023 | Krishan | ............... | G06F 11/3055 714/55 |
| 11,747,375 B2* | 9/2023 | DeCamp | ............. | G01R 22/063 702/62 |
| 11,775,335 B2* | 10/2023 | Bhandari | ................ | G06F 9/455 718/1 |
| 11,803,362 B2* | 10/2023 | Agarwalla | ............. | G06N 20/00 |
| 11,809,265 B1* | 11/2023 | Dimitrov | .............. | G06F 9/5072 |
| 2007/0260676 A1* | 11/2007 | Bozinovski | ........... | H04L 67/101 714/E11.202 |
| 2015/0127995 A1* | 5/2015 | Kripalani | ............ | G06F 11/321 714/47.1 |
| 2019/0327161 A1* | 10/2019 | Cannell | ............... | H04L 43/0817 |
| 2022/0247659 A1* | 8/2022 | Yousouf | .................. | H04L 43/12 |
| 2023/0195594 A1* | 6/2023 | Han | ........................ | G06F 9/485 707/694 |
| 2023/0230010 A1* | 7/2023 | Ramachandran | ............................ | G06Q 10/06393 705/7.39 |
| 2023/0344906 A1* | 10/2023 | Barrand | ................ | H04W 84/18 |
| 2023/0345277 A1* | 10/2023 | Barrand | ................ | H04W 24/08 |
| 2023/0388205 A1* | 11/2023 | Han | ....................... | H04L 43/10 |
| 2024/0046185 A1* | 2/2024 | Shao | ....................... | G06N 20/00 |
| 2024/0056378 A1* | 2/2024 | Allie | ..................... | H04L 67/133 |

* cited by examiner

AVAILABLE UPTIME MONITORING

CROSS-REFERENCE TO RELATED APPLICATIONS

This application claims the benefit of priority to U.S. Provisional Application Ser. No. 63/404,369, filed on Sep. 7, 2022, entitled "AVAILABLE UPTIME MONITORING," the entire contents of which are hereby incorporated by reference herein.

TECHNICAL FIELD

Implementations relate generally to computer systems, and more particularly, to methods, systems, and computer-readable media for detection and monitoring of available uptime.

BACKGROUND

Online platforms, such as software-as-a-service (SaaS) providers and online gaming platforms, generally provide visible metrics representative of system health. These metrics are typically calculated by determining if a system "ping" or message is responded to, as well as any delay in the response. It follows that as systems vary in complexity, so do the number of individual sub-systems that may each have their own individual health metrics.

While pings and messages may be gathered from multiple systems to represent rudimentary system health, the response to a ping or message is not entirely indicative of the operational characteristics of the system and underlying sub-systems. For example, while the system may accurately respond to any number of messages, the number of actual functions being processed, operations being computed, and other systemic tasks are not considered in these metrics.

Therefore, while the ability of a system to respond to a message may reflect that a system is running or "up," these responses give little insight into how well the system is functioning or even how long the system has been functioning or malfunctioning. Thus, customers, users, or developers that are reliant on the system for a defined performance or throughput have no real visibility into overall system health, and therefore, whether the system is appropriately executing their software.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of this disclosure are directed to methods, systems, and computer readable media to detect and monitor available uptime of networked computer systems, server systems, and other computer platforms.

According to one aspect, a computer-implemented method to automatically monitor system health of a computer system, the method comprising: determining a number of health check ping responses to a health check ping that are received from the computer system during an allotted timeframe; determining a number of non-error responses to a status check ping and/or requests that are received from the computer system during the allotted timeframe; aggregating the number of health check ping responses and the number of non-error responses to determine a number of active non-error periods associated with the computer system; and outputting a system health metric for the allotted timeframe based upon the number of active non-error periods.

Various implementations of the method are disclosed.

In some implementations, the computer-implemented method further comprises issuing the health check ping to the computer system at specific intervals for an evenly divisible number of sub-timeframes of the allotted timeframe.

In some implementations, the active non-error periods are of a first size, and wherein the sub-timeframes are of a second size.

In some implementations, the computer-implemented method further comprising issuing a status check ping to the computer system at specific intervals at least once per sub-timeframe.

In some implementations, aggregating the number of health check ping responses and the number of non-error responses comprises: recording for a sub-timeframe of the allotted timeframe, each health check ping response and each non-error response; and separately summing a total number of health check ping responses and non-error responses.

In some implementations, the system health metric is a quotient of the sum of the total number of health check ping responses and non-error responses, and the number of sub-timeframes within the allotted timeframe.

In some implementations, outputting the system health metric comprises one or more of: outputting a percentage value of system availability that represents a ratio of properly functioning system time to total time in the period; outputting a color-gradient graphical interface element that includes a color element, wherein a color of the color element is selected based on the ratio of properly functioning system time to total time in the period; or outputting a binary value of the system health metric based on a threshold applied to the ratio.

In some implementations: wherein outputting the percentage value comprises providing a webpage that includes the percentage value; wherein outputting the color gradient graphical interface element comprises displaying a status light of an updateable color; or wherein outputting the binary value comprises displaying a binary value or a specified color based on the threshold.

In some implementations, the computer system is a first computer system, and wherein the health check ping is sent to the first computer system by a health supervisor subroutine executing on a second computer system.

In some implementations, the number of non-error responses is measured on the first computer system and periodically reported to the second computer system.

According to another aspect, a system comprises: a memory with instructions stored thereon; and a processing device, coupled to the memory, the processing device configured to access the memory, wherein the instructions when executed by the processing device, cause the processing device to perform operations including: determining a number of health check ping responses to a health check ping that are received from the computer system during an allotted timeframe; determining a number of non-error responses to a status check ping that are received from the computer system during the allotted timeframe; aggregating the number of health check ping responses and the number of non-error responses to determine a number of active non-error periods associated with the computer system; and outputting a system health metric for the allotted timeframe based upon the number of active non-error periods.

Various implementations of the method are disclosed.

In some implementations, the operations further comprise issuing the health check ping to the computer system at specific intervals for an evenly divisible number of sub-timeframes of the allotted timeframe.

In some implementations, the periods are of a first size, and wherein the sub-timeframes are of a second size.

In some implementations, the operations further comprise issuing a status check ping to the computer system at specific intervals at least once per sub-timeframe.

In some implementations, aggregating the number of health check ping responses and the number of error responses comprises: recording for a sub-timeframe of the allotted timeframe, each health check ping response and each non-error response; and separately summing a total number of health check ping responses and non-error responses.

In some implementations, the system health metric is the quotient of the sum of the total number of health check ping responses and non-error responses, and the number of sub-timeframes within the allotted timeframe.

According to another aspect, provided is a non-transitory computer-readable medium with instructions stored thereon that, responsive to execution by a processing device, causes the processing device to perform operations comprising: determining a number of health check ping responses to a health check ping that are received from the computer system during an allotted timeframe; determining a number of error responses to a status check ping and/or requests that are received from the computer system during the allotted timeframe; aggregating the number of health check ping responses and the number of error responses to determine a number of active non-error periods associated with the computer system; and outputting a system health metric for the allotted timeframe based upon the number of active non-error periods.

Various implementations of the non-transitory computer-readable storage medium are disclosed.

In some implementations, the operations further comprise: issuing the health check ping to the computer system at specific intervals for an evenly divisible number of sub-timeframes of the allotted timeframe; and issuing a status check ping to the computer system at specific intervals at least once per sub-timeframe.

In some implementations, the periods are of a first size, and wherein the sub-timeframes are of a second size.

In some implementations, aggregating the number of health check ping responses and the number of non-error responses comprises: recording for a sub-timeframe of the allotted timeframe, each health check ping response and each non-error response; and summing a total number of health check ping responses and non-error responses; and wherein the system health metric is the quotient of the sum of the total number of health check ping responses and non-error responses, and the number of sub-timeframes within the allotted timeframe.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
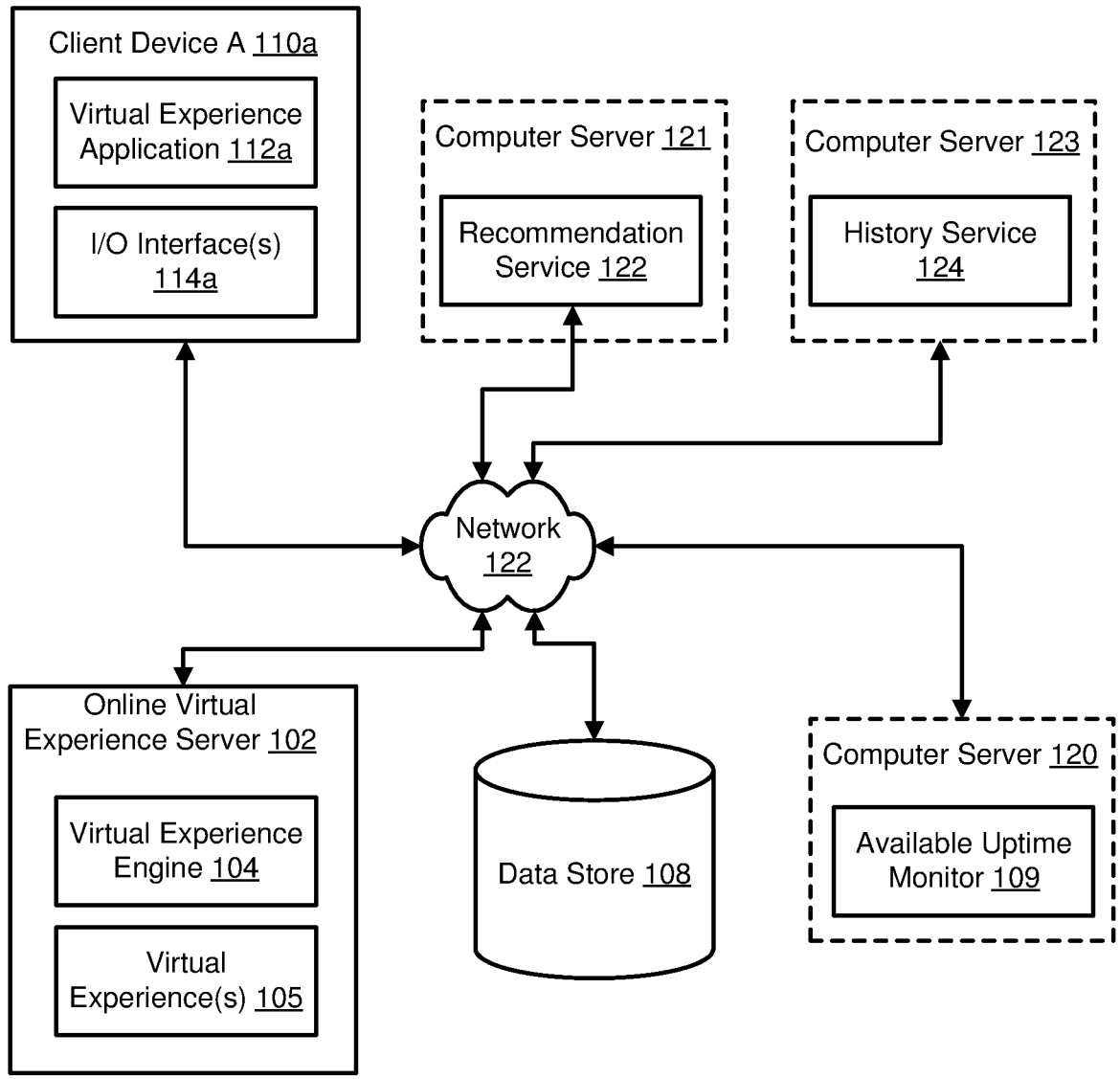
FIG. 1 is a diagram of an example network environment, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

In some aspects, systems and methods are provided for detection and monitoring of available uptime. Online platforms, such as software-as-a-service (SaaS) providers and online virtual experience platforms, generally provide visible metrics representative of system health. These metrics are typically calculated by determining if a system "ping" or message is responded to, whether a "heartbeat" message is being emitted on an expected cadence or other methods to determine whether a system is running or "up". It follows that as systems vary in complexity, so do the number of individual sub-systems that necessitate health metrics. Accordingly, some features are provided for analyzing types, frequency, and status of different "ping responses." Additionally, there may be other ways of determining whether a system is functioning properly, such as how many errors of certain types are occurring or whether it is performing actions at the expected rate. Upon analyzing, features may generate an available uptime metric indicating the overall health of the entire system, portions of a system, and/or individual sub-systems associated with particular users and/or developers for some period of time.

For example, virtual experience platforms may include user-generated content or developer-generated content (each referred to as "UGC" herein). The UGC may be stored and implemented through the virtual experience platform, for example, by allowing users to search and interact with various virtual experiences. Often, a developer associated with particular content may desire a view into how well the virtual experience platform is performing (in terms of availability of the platform to one or more users, in one or more geographies, etc. or in terms of performance of the platform for one or more applications), and therefore, determine if the platform is sufficiently stable and has sufficient performance to warrant additional content creation and/or user engagement. Furthermore, users may desire a rapidly accessible view into the stability of a platform and/or a view as to why a platform may be performing in a particular manner to understand whether they can use the experiences on the platform or need to wait until things are functioning properly. The team running the platform may also use the metric to understand how to improve its operation or determine if recent changes have degraded the functioning of the platform or its systems. Other benefits associated with increases in user engagement, as well as improvements in a user's experience are also applicable.

Through provision of the available uptime metric, whether granular and associated with individual sub-components, or, broadly representative of a system as a whole, users, developers and the team running the platform may accurately and rapidly view a relevant health metrics in a user-friendly manner. Hereinafter, a more detailed description of the operation of a virtual experience platform and associated available uptime monitoring is provided.

Online virtual experience platforms (also referred to as "user-generated content platforms" or "user-generated content systems") offer a variety of ways for users to interact with one another. For example, users of an online virtual experience platform may work together towards a common goal, share various virtual items/objects, send electronic messages to one another, and so forth. Users of an online virtual experience platform may join scenarios or virtual experiences as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

The online virtual experience platform may also support use of virtual objects that mimic physical objects (rigid body objects) within a virtual environment. For example, the online virtual experience platform may enable users to design and introduce various categories of virtual objects, e.g., vehicles, weapons and weapon accessories, toys, structures, etc. These objects may be viewed by one or more users within a virtual environment supported by the online virtual experience platform. For example, motion of such objects within the virtual environment may be displayed on user devices.

An online virtual experience platform may also allow users (developers) of the platform to create new objects and/or mechanisms. For example, users of the online virtual experience platform may be enabled to create, design, and/or customize new objects such as vehicles, tools, toys, and make them available to other users.

The online virtual experience platform (also referred to as a game or gaming platform) may provide tools to support simulation of objects and mechanisms within a virtual environment. In some implementations, a rendering engine, physics engine and/or physics solver may be utilized for the simulation of objects.

Some objects and/or parameters within a virtual environment may be such that the complexity of simulating the objects and environment may be computationally expensive to enable the simulation to meet time requirements for real-time simulation and rendering of the object. For example, a representation of a novel object may have to be performed within a time period that meets requirements for a particular frame refresh rate of a display device. Failure to meet the time requirement can lead to jittery updates, leading to a poor visual experience for the user. Thus, aspects provide features for monitoring available uptime to aid in determining whether particular components or sub-systems of the online virtual experience platform are performing normally. The monitored available uptime may further enhance debugging procedures, by, for example, focusing searches for bugs in systems with low levels of available uptime.

FIG. 1: System Architecture

FIG. 1 illustrates an example network environment 100, in accordance with some implementations of the disclosure. FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g., "110" in the text refers to reference numerals "110a," "110b," and/or "110n" in the figures).

The network environment 100 (also referred to as a "platform" herein) includes an online virtual experience server 102, a data store 108, a client device 110 (or multiple client devices), computer server 120, computer server 121, and computer server 123, all connected via a network 122.

The online virtual experience server 102 can include, among other things, a virtual experience engine 104 and one or more virtual experiences 105. The data store 108 is shown coupled to online virtual experience server 102 and computer server 120, but in some implementations, can also be provided as part of the online virtual experience server 102 or part of computer server 120.

The client device 110 can include a virtual experience application 112 and an I/O interface 114, to interact with the online virtual experience server 102, and to view, for example, graphical user interfaces (GUI) through a computer monitor or display (not illustrated).

The computer server 120 can include, among other things, an available uptime monitor 109. The available uptime monitor 109 may also be configured to execute on the online virtual experience server 102, or on another server. The available uptime monitor 109 may be configured to execute as a standalone service, in some implementations. The available uptime monitor 109 may be configured to determine an available uptime metric for a monitored service, which will be described more fully below.

The computer server 121 can include, among other things, a recommendation service 122. The recommendation service 122 may also be configured to execute on the online virtual experience server 102, or on another server. The recommendation service 122 may be a service configured to provide personalized recommendations of media items, virtual content, and/or other items that may be stored and accessed via the online virtual experience server 102, or another server.

The computer server 123 can include, among other things, a history service 124. The history service 124 may also be configured to execute on the online virtual experience server 102, or on another server. The history service 124 may be a service configured to provide and/or store historical data related to a user, a user device, a client device, searches, and other suitable history that may be stored and accessed via the online virtual experience server 102, or another server.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, each of the online virtual experience server 102, computer server 120, computer server 121, and computer server 123, can include a server having one or more computing devices (e.g., a cloud computing system, a rackmount server, a server computer, cluster of physical servers, virtual server, etc.). In some implementations, a server may be included in the online virtual experience server 102 (or any other illustrated server), be an independent system, or be part of another system or platform. In some implementations, the online virtual experience server 102 may be a single server, or any combination a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, each of the online virtual experience server 102, computer server 120, computer server 121, and computer server 123 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience platform 102 (or any other illustrated server) and to provide a user (e.g., user 114 via client device 110) with access to online virtual experience server 102 (or to another illustrated server). The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, three-dimensional (3D) games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the virtual experience server 102.

In some implementations, online virtual experience server 102 or client device 110 may include the virtual experience engine 104 or virtual experience application 112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration, rather than limitation. In some implementations, any number of client devices 110 may be used.

In some implementations, each client device 110 may include an instance of the virtual experience application 112. The virtual experience application 112 may be rendered for interaction at the client device 110. During interaction, the example methods disclosed herein may monitor available uptime of some or all of the portions of the platform 100 (e.g., services such as recommendation service 122, history service 124, virtual experience engine 104, virtual experiences 105, etc.). In this manner, a user of client device 110 may readily access available uptime metrics to determine how the platform 100 is performing. In at least one implementation, the platform 100 may be configured to utilize and/or display available uptime in a manner that is representative of: stability of the platform 100 or individual components and/or services, functioning of the platform 100 or individual components and/or services, and other suitable metrics representative of health of the platform 100. Therefore, users and developers may readily view statistics associated with the platform such that a user experience is improved and/or a developer experience is improved.

Figure 2:
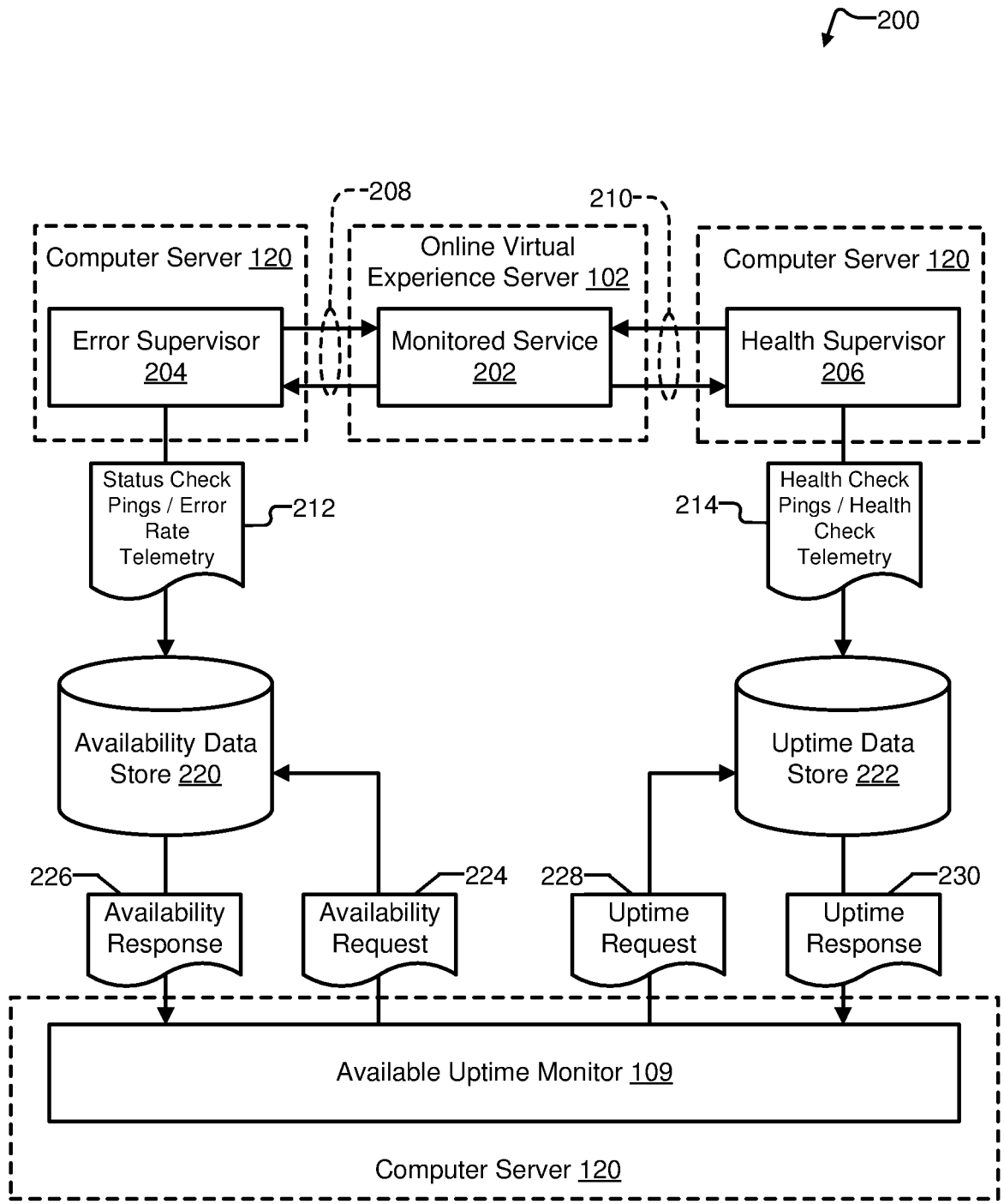
FIG. 2 is a diagram of an example system architecture to monitor available uptime, in accordance with some implementations.

FIG. 2: Available Uptime Monitor

FIG. 2 is a diagram of an example system architecture 200 of a system that can be utilized to monitor available uptime, in accordance with some implementations.

The system architecture 200 (also referred to as a "subsystem" herein) includes the online virtual experience server 102, available uptime monitor 109, computer server 120, an example monitored service 202, error supervisor 204, health supervisor 206, availability data store 220, and uptime data store 222. Online virtual experience server 102 may be arranged as described above with reference to FIG. 1.

As illustrated, an example monitored service 202 may be executed on the online virtual experience server 102. The example monitored service 202 may also execute on a different server, in some implementations. The example monitored service 202 may include any suitable service. For example, the monitored service 202 may be any software component, application, or logic component that is configured to provide a service via the online experience platform 100. The monitored service 202 may execute on the server 102 and provide responses to one or more of the error supervisor 204 or health supervisor 206.

It is noted that while illustrated as a single, monitored service 202, any number of services, components, subcomponents, systems, and sub-systems may be monitored as described herein. Therefore, while illustrated as a single component, more or fewer monitored services, components, sub-components, systems, and sub-systems are also applicable.

The error supervisor 204 may be a software component executed at the server 120 and configured to monitor specific or desired error responses from any monitored service (e.g., monitored service 202). The error supervisor 204 may also be configured to execute at a different server, in some implementations. The error supervisor 204 may be configured to communicate with the monitored service 202 via communication protocol 208, e.g., routinely, or periodically, or upon invocation. For example, communication protocol 208 may include any suitable protocol, including protocols from an exposed application programming interface (API), or other suitable protocols. Additionally, the error response mix may be reported by the monitored service to the error supervisor or the supervisor may request information from the monitored service. Data reported may be reported individually, in batches, or in aggregate.

The health supervisor 206 may be a software component executed at the server 120 and configured to monitor specific or desired health check ping responses from any monitored service (e.g., monitored service 202). The health supervisor 206 may also be configured to execute at a different server, in some implementations. The health supervisor 206 may be configured to communicate with the monitored service 202 via communication protocol 210, e.g., routinely, or periodically, or upon invocation. For example, communication protocol 210 may include any suitable protocol, including protocols from an exposed API, or other suitable protocols.

It is noted that the error supervisor 204 and health supervisor 206 are representative examples only. Furthermore, in some implementations, more or fewer supervisor software components may be provided. For example, and without limitation, in one implementation, the error supervisor 204 and the health supervisor 206 may be combined into a singular software component encompassing all or most of the individual functionality described in detail herein. In some implementations, the error supervisor 204 and health supervisor 206 may also be configured to monitor available uptime using other responses and techniques that differ from status check pings and health check pings. Other variations are within the scope of this disclosure.

The availability data store 220 and the uptime data store 222 may each be a non-transitory computer readable memory (e.g., random access memory), a cache, a drive (e.g., a hard drive), a flash drive, a database system, or another type of component or device capable of storing data. The data store 220 and the data store 222 may also include multiple storage components (e.g., multiple drives or multiple databases) that may also span multiple computing devices (e.g., multiple server computers).

It is noted that while illustrated and described as separate components, the data store 220 and the data store 222 may also be combined into a single data storage component, be extended across multiple individual data storage components, be a part of a software-as-a-service storage component, and/or be implemented in various other manners. Accordingly, the particular type, configuration, and number of data stores may be varied without departing from the scope of this disclosure.

During execution or during an initialized state of the server 120, available uptime monitor 109 may perform a method to monitor available uptime of portions or the entirety of the online virtual experience platform 100. For example, in some implementations, the available uptime monitor 109 may routinely or periodically issue availability requests 224 and uptime requests 228.

In some implementations, the availability requests 224 may be issued to the error supervisor 204, either directly or indirectly (e.g., via the data store 220). The availability requests 224 may identify a particular service, component, sub-component, system, or sub-system to be monitored. Responsive to the availability requests 224, the error supervisor 204 may communicate with the identified monitored service (e.g., service 202) and provide a number of status check pings or error rate telemetry 212 for storage at the data store 220. The status check pings or telemetry 212 may be recorded for future analysis, in some implementations.

Responsive to receipt of the status check pings or telemetry 212, the error supervisor may also provide an availability response 226, either directly or indirectly (e.g., through data store 220) to the available uptime monitor 109. The availability response 226 may include data indicative of a number of error responses received by the error supervisor 204 from a monitored service. For example, the error responses may include: structured error responses based upon a defined type, such as hypertext transfer protocol (HTTP) 500 responses. Other variations are also applicable.

Additionally, in some implementations, the available uptime monitor 109 may routinely or periodically issue uptime requests 228.

In some implementations, the uptime requests 228 may be issued to the health supervisor 206, either directly or indirectly (e.g., via the data store 222). The uptime requests 228 may identify a particular service, component, sub-component, system, or sub-system to be monitored. Responsive to the uptime requests 228, the health supervisor 206 may communicate with the identified monitored service (e.g., service 202) and provide a number of health check pings or health check telemetry 214 for storage at the data store 222. The health check pings or telemetry 214 may be recorded for future analysis, in some implementations.

Responsive to receipt of the health check pings or telemetry 214, the health supervisor may also provide an uptime response 230, either directly or indirectly (e.g., through data store 222) to the available uptime monitor 109. The uptime response 230 may include data indicative of a number of success responses received by the health supervisor 206 from a monitored service. For example, the success responses may include: structured success responses based upon a defined protocol, such as HTTP 200 responses. Other variations are also applicable.

Based upon the data associated with the availability response 224 and the uptime response 230, for a defined time period, the available uptime monitor 109 may combine them to determine a measure of actual, available uptime for the monitored service 202.

It is noted that although described as pertaining to a number of pings (e.g., status check and health pings), in general, other implementations are also applicable. For example, different forms and types of responses may be used to determine whether a monitored service is both available and "up." For example, and without limitation, the available uptime monitor 109 may be configured to determine an appropriate uptime metric using one or more of: proxy instance communications, transmission control protocol (TCP) communications, user datagram protocol (UDP) communications, remote procedure call communications (e.g., Google™ Remote Procedure Calls), heartbeat communications, various response code responses, and/or any other suitable communications or messages that are indicative of an active and executing service. Thus, through monitoring of these communications in a periodic manner, the available uptime monitor 109 may determine the available uptime metric as described herein.

Furthermore, different forms of determinations of availability of a monitored service may also be applicable. For example, latency-based availability may be implemented through the selection of one or more latency thresholds. For example, service owners might configure one or more threshold latencies (e.g., 500 ms is acceptable P99 latency for this service, and 750 ms is 'tolerable' P99 latency for this service) for determining availability of a service. A service can then be considered to be unavailable or less available if it doesn't respond within the configured latencies, even if it is responding correctly.

As an additional example, a database may be considered available based on other determinations of availability, as well. For example, a probing service may be configured to report availability of one or more data stored through probing of the data store with one or more requests. The requests may then form a basis for determining that the particular data store is available.

As an additional example, any of the above-described features may be combined to form a basis for a determination of available uptime. For example, a combination of any communication-based measurement as well as a latency-based availability may be used to determine an available uptime. Other variations and combinations are also applicable, depending upon any desired implementation.

Hereinafter, example data useful in determining available uptime is described in detail below with reference to FIG. 3A and FIG. 3B.

Figure 3A:
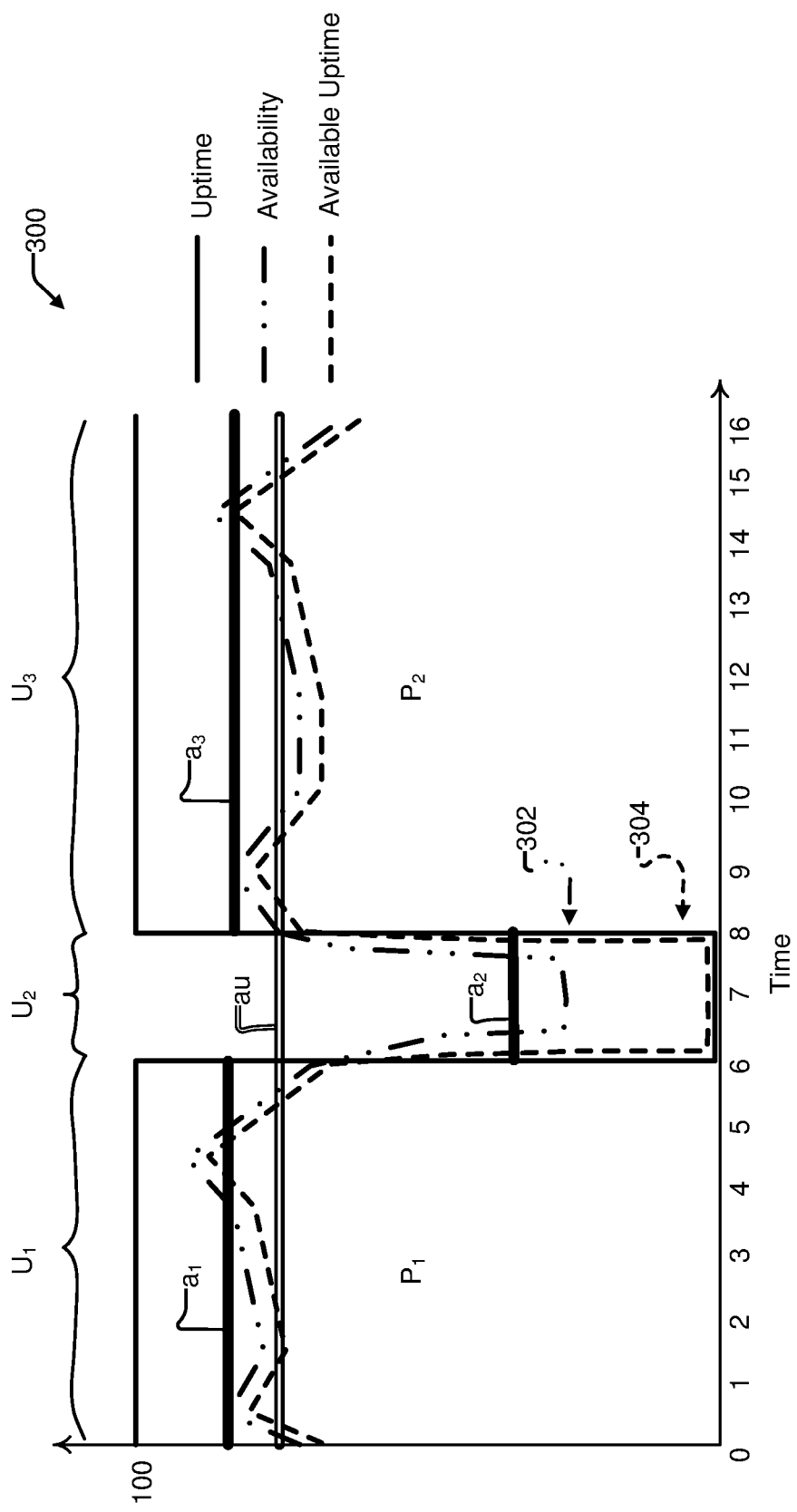
FIG. 3A is an example graph illustrative of available uptime.
Figure 3B:
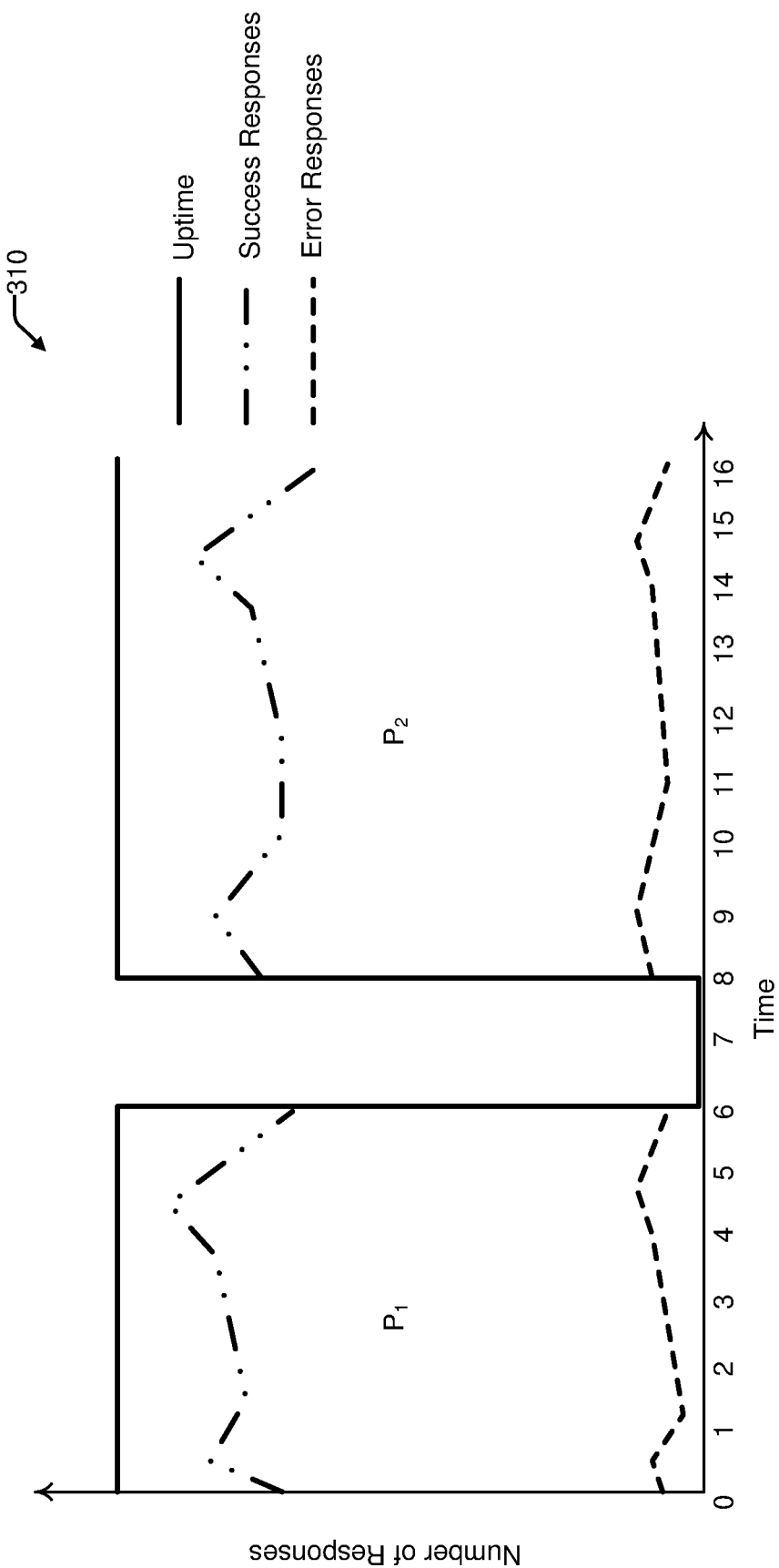
FIG. 3B is an additional example graph illustrative of available uptime.

FIG. 3A and FIG. 3B: Available Uptime Data

FIG. 3A is a graph 300 and FIG. 3B is a graph 310 of example data illustrative of determining available uptime. It is noted that the description provided in reference to FIGS. 3A and 3B is illustrative only, and not limiting. For example, actual monitored services may provide more, fewer, or different responses than those illustrated. Accordingly, actual functionality of the described implementations may differ from the provided examples. Hereinafter, several definitions of terms as well as formal equations to represent available uptime are presented in detail.

As used herein, "uptime" refers to a percentage of time out of a defined time period that a system is actually running. For a computer system, uptime refers to the amount of time the computer system is "on" divided by the total time in the period. Uptime does not reflect whether the computer system was able to do meaningful work during the time it was on. Accordingly, uptime may range from 0% (if the system was down for all of a time period) to 100% (if the system was up the entire time period). Note that "actually running" is from the perspective of from where the system is being accessed. Thus, the system may be "on" or "up" from the perspective of a user and health check pings originating from San Francisco but "off" or "down" from the perspective of a user and health check pings originating from London (e.g., if the transatlantic cable is currently down and the service is in the USA).

As used herein, "availability" refers to percentage of time that a system is working correctly for a defined time period. For a computer system with a defined function (e.g., a temperature monitor component of the computer system), the availability refers to an amount of time during the defined period where it was successfully performing the defined function (e.g., taking temperature measurements successfully), divided by the amount of time in that period. Accordingly, "availability" may range from 0% (if the system was not working correctly at all during the time period) to 100% (if the system was working correctly the entire time period).

As used herein, "available uptime" (AU) represents the percentage of time that a system is correctly operating over a defined period of time which may include both periods when the system is up and periods when the system is down. In general, the available uptime is represented by the sum of the duration of each period of uptime multiplied by the availability during that uptime period, and divided by the total period for which available uptime is being queried. Generally, the "available uptime" may also be a percentage between 0% for a non-functional system to 100% for a system which is both on and functioning correctly all the time.

The following Equation 1 represents a calculation for determining available uptime based on the definitions provided above:

$$\text{Available Uptime for period} = \frac{\sum_{u_p \in \text{available uptime period}} (\text{availability during } u_p \times \text{minutes in } u_p)}{\text{minutes in availability uptime period}} \quad \text{Equation 1}$$

In Equation 1, $u_p$ represents a defined time period when the system is "up".

The following Equation 2 represents an alternative calculation for determining available uptime based on the definitions provided above:

$$\text{Available Uptime for period} = \frac{\sum_{u_p \in \text{available uptime period}} (\text{availability during } u_p \times \text{oPercent}(u_p) \times \text{minutes in } u_p)}{\text{minutes in availability uptime period}}$$

In Equation 2, up represents a defined time period when the system is partially "up" at a constant "up" percentage, upPercent. upPercent is calculated as a weighted average of uptimes for some portion of a defined period, where the uptime is being observed in different ways. Equation 2 may be useful in scenarios, for example, where a system is being observed for uptime from different locations (e.g., Up from location 1, Down from location 2 during some period of time=50% Up for that period of time). The example provided below with reference to FIG. 3 assumes a binary measure.

Turning to FIG. 3A, an amount of time a particular component issues healthy communications of any type, divided by the total time in an associated time interval, is the particular component's uptime. For example and as illustrated, a monitored service 202 may have an uptime shown by the solid line, with an observed downtime from times 6 through 8. During the downtime, the monitored service 202's availability dips down as shown in 302 (it is still running but perhaps not handling traffic from the location where uptime is being monitored). It follows that, as shown in 304, the monitored service 202's available uptime diminishes to approximately zero during the downtime from time 6 through 8 since although it is still handling some requests correctly, it is handling none from the location where uptime is being measured.

While FIG. 3A graphs uptime, availability, and available uptime as nearly continuous (e.g., perhaps for 1 minute intervals over the 16 hour total time period), typically available uptime would be calculated as a number over a larger period. In this case the three uptime periods $u_1$, $u_2$ and $u_3$ would be combined with the average availability during those periods, $a_1$, $a_2$ and $a_3$ to create a single available uptime au (t=0 to 16) for the whole period which would be $(u_1 \times a_1 + u_3 \times a_3)/(u_1 + u_2 + u_3)$. Note that $u_2$ is omitted in the numerator since the system is down during that time period. Turning to FIG. 3B, a particular, non-limiting example of different types of responses is illustrated.

As shown in FIG. 3B, if a component (e.g., a system, website, virtual experience, etc.) returns a faulty response to a health-check ping for 2 hours (between hours 6-8) over a 16 hour period, the component was available or "up" for 14 hours total. In the illustrated example, the hours 0-6 and 8-16 are "up-intervals." The up-intervals may be used in determining a total available uptime.

In addition to monitoring the uptime, FIG. 3B also illustrates a function of a monitored component's non-error responses out of all responses for periods in which the monitored component is "up." For example, if the monitored component, during hours 0-6, returns 900 success responses and 100 error responses, then there is (900/1000)*6=5.4 "available-hours" during period $P_1$. If then during hours 8-16 there are a further 800 success responses and 200 error responses, the period $P_2$ includes (800/1000)*8=6.4 "available-hours".

Given the previous two parts of this example, the "available-hours" of each "up-interval" (e.g., $P_1$ and $P_2$) are aggregated (or summed) and divided by the total interval time. So, for this example, 5.6+6.4=11.8 total "available-hours" are divided by the entire 16-hour interval. Accordingly, in this example there is a metric of 11.8/16=0.7375, which represents available uptime of the component providing the example data of FIG. 3B.

The available uptime (for any methodology of calculation) may be reflected as a percentage, as a color-gradient representative of a percentage (e.g., red=zero and green=1.0), or as any other suitable visual display of a numerical value. Hereinafter, graphical user interfaces for display of health metrics and available uptime are described with reference to FIG. 4.

Figure 4:
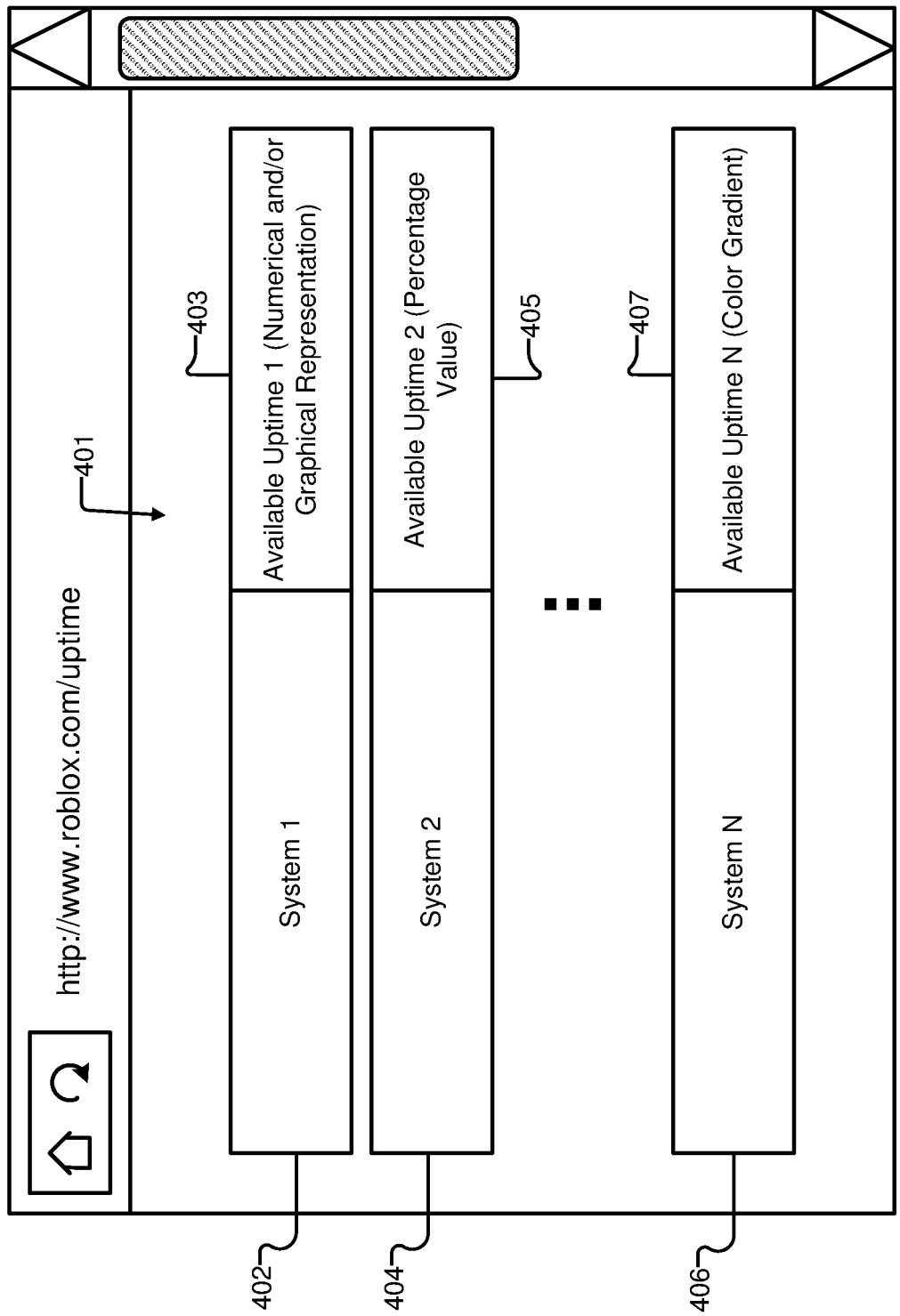
FIG. 4 is a schematic of a graphical user interface that displays available uptime of portions of a virtual experience platform, in accordance with some implementations.

FIG. 4: Display of Available Uptime

FIG. 4 is a schematic of an example graphical user interface (GUI) 400 to display available uptime of portions of a virtual experience platform 100, in accordance with some implementations. The GUI 400 may be varied in form and/or number of displayed interface elements. Accordingly, the illustrated example GUI is not limiting of all implementations.

The GUI 400 may include a main portion 401 configured to display one or more system health metrics 402, 404, and/or 406. Each portion 402, 404, and 406 may include a metric display portion 403, 405, and 407, respectively. The metric display portions 403, 405, and 407 may display the same, or different, forms of available uptime.

For example, an overall health metric represented by a percentage may be provided at any of the metric display portions 403, 405, and 407. Alternatively, an overall health metric represented by a color gradient may be provided at any of the metric display portions 403, 405, and 407. Alternatively, an overall health metric represented by two or more colors may be provided at any of the metric display portions 403, 405, and 407. It is noted that different colors may represent values falling between two thresholds (e.g., 0-30%=red, 31-60%=yellow, 61-100%=green). More or fewer thresholds and colors may also be applicable.

The GUI 400 may be presented to users specifically requesting or accessing the GUI 400, depending upon access rights. For example, user account data may be used to identify whether a particular user has privileges to access/view detailed health metrics, or simplified health metrics. The GUI 400 may also be provided as a web-page with password protection or other access protection, depending upon a desired implementation.

Hereinafter, a more detailed description of a method of monitoring available uptime is provided with reference to FIG. 5A and FIG. 5B. It is noted that FIG. 5A and FIG. 5B illustrate different method implementations, and many other variations of these methods may be possible without departing from the scope of this disclosure.

Figure 5A:
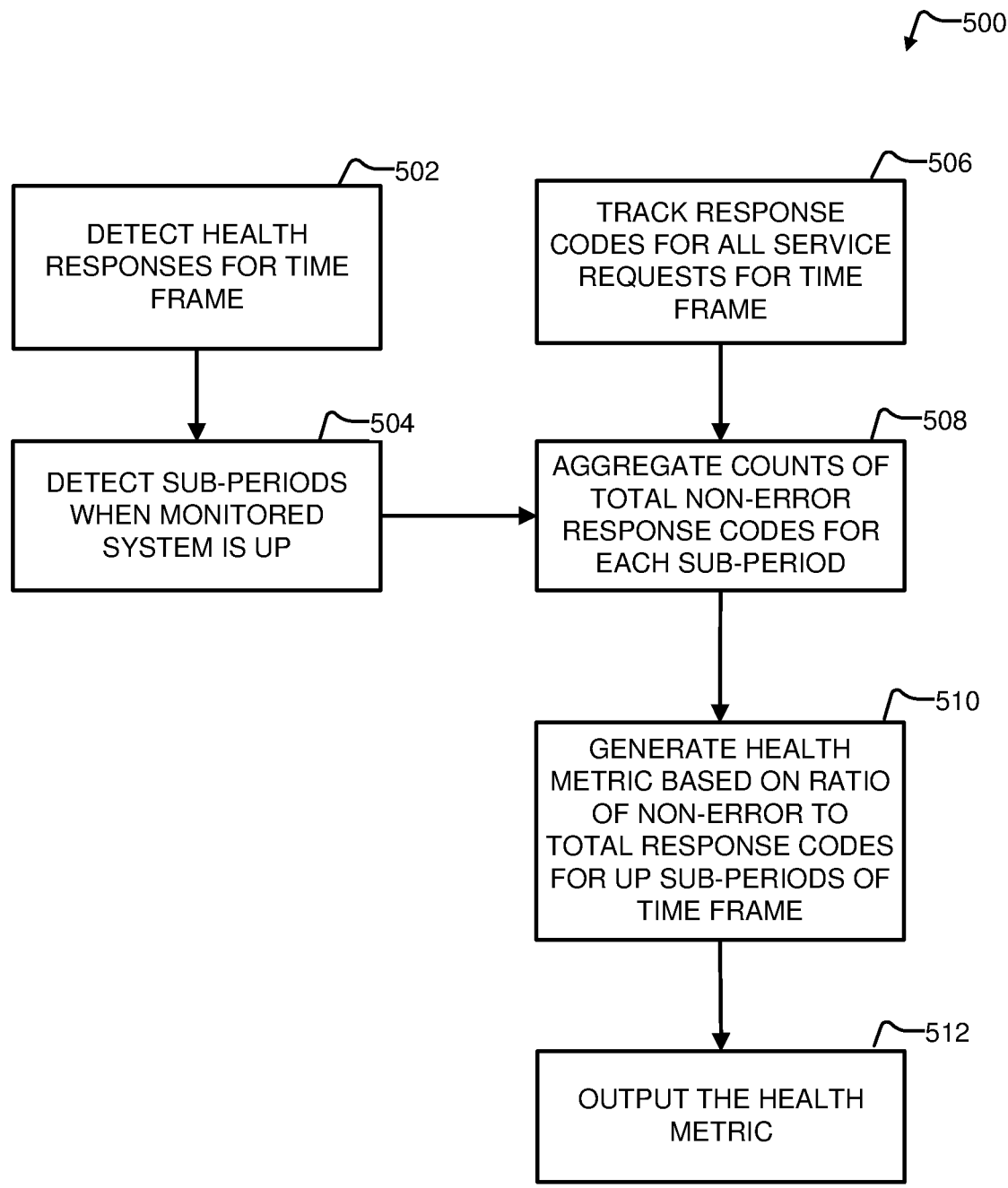
FIG. 5A is a flowchart illustrating an example method to monitor available uptime, in accordance with some implementations.
Figure 5B:
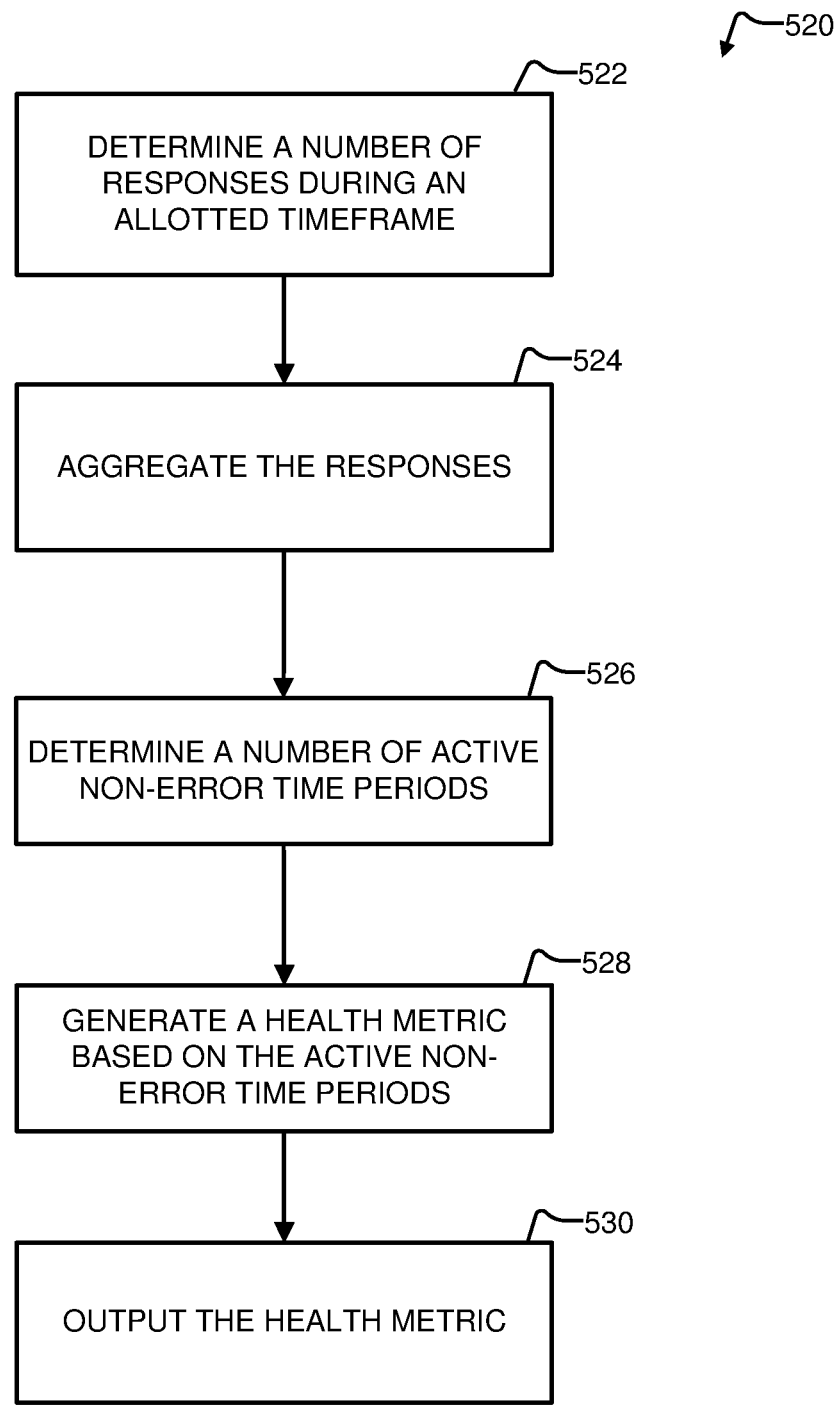
FIG. 5B is a flowchart illustrating an alternative example method to monitor available uptime, in accordance with some implementations.

FIGS. 5A-5B: Monitoring Available Uptime

FIG. 5A is a flowchart illustrating an example method 500 to monitor available uptime, in accordance with some implementations.

In some implementations, method 500 can be implemented, for example, on a server 102 described with reference to FIG. 1 and FIG. 2. In some implementations, some or all of the method 500 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., a number of user complaints exceeding a threshold, a number of system errors exceeding a threshold, a predetermined time period having expired since the last performance of method 500, and/or one or more other conditions occurring which can be specified in settings read by the method.

Method 500 may begin at block 502. At block 502, health responses for a time frame are detected. For example, the health responses may include any health response defined herein. Block 502 is followed by block 504.

At block 504, sub-periods of time when a monitored system is defined as being "Up" are detected where an "Up" sub-period is one where the health responses for the system for that entire period all indicate the system is healthy. Block 504 is followed by block 508.

At block 506, response codes for all service requests are tracked for the time frame. It is noted that in some implementations blocks 502 and 506 may be performed in parallel or substantially in parallel. Block 506 is also followed by block 508.

At block 508, counts of total non-error response codes are aggregated for each sub-period for which the system was determined to be "Up" in block 504. In this manner, the up sub-periods of block 504 are used to determine aggregation periods for block 508. Block 508 is followed by block 510.

At block 510, a health metric is generated based upon the ratio of non-error to total response codes for "Up" sub-periods of the time frame normalized by the quotient of the duration of the sub-periods and the total time of the period. Block 510 is followed by block 512.

At block 512, the health metric is output as requested. For example, the health metric may be displayed or presented at a GUI, such as GUI 400. Furthermore, the health metric may be summed, averaged, or aggregated with other health metrics and presented at a GUI in a simplified format.

In some implementations, the health metric may be output as one or more of: a percentage value of system availability that represents a ratio of properly functioning system time and non-properly functioning system time; a color-gradient graphical interface element that includes a color element, wherein a color of the color element is selected based on the properly functioning system time and the non-properly functioning system time; or a binary value of the system health metric based on a threshold (e.g., threshold of 90%, 95%, or another threshold). Other variations are also applicable.

Blocks 502-512 can be performed (or repeated) in a different order than described above. Method 500 can be performed on a server (e.g., 102) and/or a client device (e.g., 110). Furthermore, portions of the method 500 may be combined and performed in sequence or in parallel, according to any desired implementation.

As described above, a computer-implemented method of monitoring available uptime may include detecting health responses and tracking response codes for a time frame, detecting sub-periods when monitored system is up, aggregating counts of total non-error response codes for each sub-period, and generating a health metric based on a ratio of non-error to total response codes for up sub-periods of the monitored time frame normalized by the quotient of the duration of the sub-periods and the total time of the period. Other variations may also be applicable.

For example, one variation is described herein-below with reference to FIG. 5B. It is noted that FIG. 5B is illustrative of one implementation, and that other implementations exist.

FIG. 5B is a flowchart illustrating an example method 520 to monitor available uptime, in accordance with some implementations.

In some implementations, method 520 can be implemented, for example, on a server 102 described with reference to FIG. 1 and FIG. 2. In some implementations, some or all of the method 520 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 520. In some examples, a first device is described as performing blocks of method 520. Some implementations can have one or more blocks of method 520 performed by one or more other devices (e.g., other client devices or server devices) that can send results or data to the first device.

In some implementations, the method 520, or portions of the method, can be initiated automatically by a system. In some implementations, the implementing system is a first device. For example, the method (or portions thereof) can be periodically performed, or performed based on one or more particular events or conditions, e.g., a number of user complaints exceeding a threshold, a number of system errors exceeding a threshold, a predetermined time period having expired since the last performance of method 520, and/or one or more other conditions occurring which can be specified in settings read by the method.

Method 520 may begin at block 522. At block 522, a number of health check ping responses and non-error responses are determined. For example, error supervisor 204 may receive a number of non-error responses to a status check ping received from a computer system during an allotted timeframe. Additionally, health supervisor 206 may receive a number of health check ping responses to a health check ping received from the computer system during the allotted timeframe. The available uptime monitor 109 may determine a total number of responses based upon data received from the error supervisor 204 and the health supervisor 206.

It is noted that in some implementations, the error supervisor 204 and the health supervisor 206 may be executed at separate computer systems. In some implementations, the health check pings and status check pings may be issued to the computer system at specific intervals for an evenly divisible number of sub-timeframes of the allotted timeframe. In some implementations, the health check pings and status check pings are issued to the computer system at least once per sub-timeframe.

It is also noted that different forms of communications may also be monitored in alternative to health check pings and status check pings. For example, monitored messages may include one or more of: proxy instance communications, transmission control protocol (TRP) communications, user datagram protocol (UDP) communications, remote procedure call communications (e.g., Google™ Remote Procedure Calls), heartbeat communications, various response code responses, and/or any other suitable communications or messages that are indicative of an active and executing service. Block 522 may be followed by block 524.

At block 524, the health check ping responses and non-error responses are aggregated. For example, the available uptime monitor 109 may aggregate, sum, or otherwise combine the health check ping responses and non-error responses. If following one of Equation 1 or Equation 2, the available uptime monitor 109 may sum the health check ping responses and the non-error responses, separately. In some implementations, the aggregating may include recording for a sub-timeframe of the allotted timeframe, each health check ping response and each non-error response, and separately summing a total number of health check ping responses and non-error responses.

It is also noted that different forms of communications may also be aggregated in alternative to health check pings and status check pings. For example, aggregated messages may include one or more of: proxy instance communications, transmission control protocol (TRP) communications, user datagram protocol (UDP) communications, remote procedure call communications (e.g., Google™ Remote Procedure Calls), heartbeat communications, various response code responses, and/or any other suitable communications or messages that are indicative of an active and executing service. Block 524 may be followed by block 526.

At block 526, a number of active, non-error time periods are determined. For example, the available uptime monitor 109 may discern the non-error time periods by analyzing the health check ping responses and the non-error responses for the allotted timeframe. Additionally, the available uptime monitor 109 may discern the non-error time periods by analyzing the other communications for the allotted timeframe. Sub-time periods where no responses and/or communications are received may be deemed to be "down". Similarly, time periods where adequate responses and/or communications are received may be deemed to be "up". In some implementations, the active non-error periods are of a first size (e.g., one hour), and the sub-timeframes are of a second size (e.g., at least fifteen minutes in duration). Block 526 may be followed by block 528.

At block 528, a health metric is generated based on the active non-error time periods. For example, the available uptime monitor 109 may implement either Equation 1 or Equation 2 to determine an actual percentage or numerical value for available uptime. In some implementations, the health metric is the quotient of the sum of the total number of health check ping responses and non-error responses, and the number of sub-timeframes within the allotted timeframe. Block 528 may be followed by block 530.

At block 530, the generated health metric may be output. For example, the health metric may be displayed or presented at a GUI, such as GUI 400. Furthermore, the health metric may be summed, averaged, or aggregated with other health metrics and presented at a GUI in a simplified format.

In some implementations, the health metric may be output as one or more of: a percentage value of system availability that represents a ratio of properly functioning system time and non-properly functioning system time; a color-gradient graphical interface element that includes a color element, wherein a color of the color element is selected based on the properly functioning system time and the non-properly functioning system time; or a binary value of the system health metric based on a threshold (e.g., threshold of 90%, 95%, or another threshold). Other variations are also applicable.

Blocks 522-530 can be performed (or repeated) in a different order than described above and/or one or more blocks can be omitted. Method 520 can be performed on a server (e.g., 102) and/or a client device (e.g., 110). Furthermore, portions of the method 520 may be combined and performed in sequence or in parallel, according to any desired implementation.

As described above, the techniques of available uptime monitoring include aggregating communications (e.g., health check ping responses and non-error responses) from monitored components. The monitored components can include virtually any portion of the platform 100. The aggregated communications and/or responses may be used in determining an appropriate metric of available uptime that accurately reflects a health of the platform 100 (or other platforms) and is readily accessible by users, administrators, developers, and other users of the platform 100. Furthermore, the available uptime may also be used to direct debugging efforts, provide service level agreement monitoring, and other suitable functions.

Hereinafter, a more detailed description of various computing devices that may be used to implement different devices and/or components illustrated in FIGS. 1-2 is provided with reference to FIG. 6.

Figure 6:
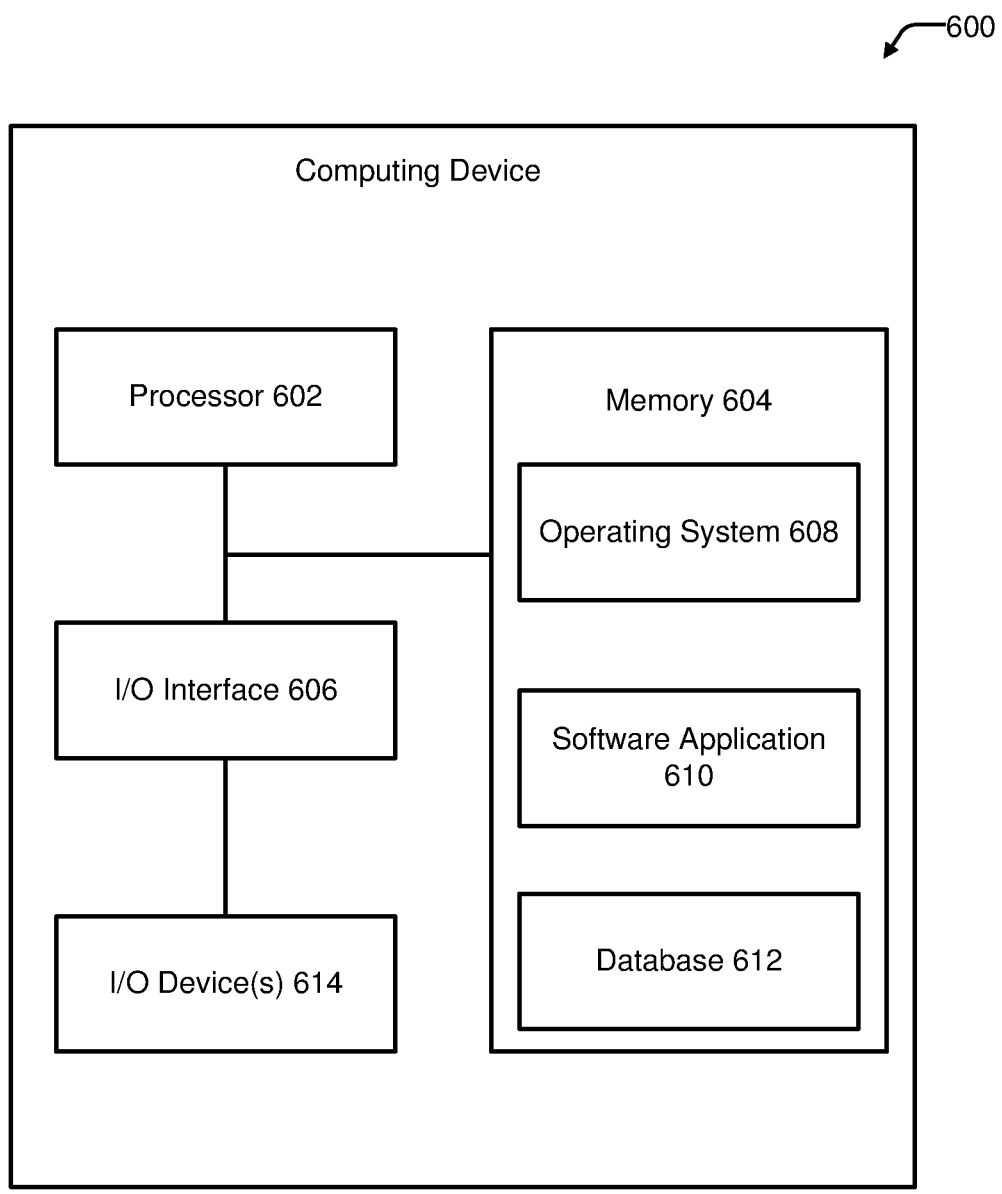
FIG. 6 is a block diagram illustrating an example computing device, in accordance with some implementations.

FIG. 6 is a block diagram of an example computing device 600 which may be used to implement one or more features described herein, in accordance with some implementations. In one example, device 600 may be used to implement a computer device, (e.g., 102, 110 of FIG. 1 and FIG. 2), and perform appropriate operations as described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614 (e.g., display screen, touchscreen, display goggles or glasses, audio speakers, headphones, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, software application 610 and associated data 612. In some implementations, the applications 610 can include instructions that enable processor 602 to perform the functions described herein, e.g., some or all of the method of FIG. 5. Software application 610 may include some or all of the functionality required to monitor available uptime, as described above, and/or present graphical user interface(s) (GUI) associated with display of available uptime. In some implementations, one or more portions of software application 610 may be implemented in dedicated hardware such as an application-specific integrated circuit (ASIC), a programmable logic device (PLD), a field-programmable gate array (FPGA), a machine learning processor, etc. In some implementations, one or more portions of software application 610 may be implemented in general purpose processors, such as a central processing unit (CPU) or a graphics processing unit (GPU). In various implementations, suitable combinations of dedicated and/or general purpose processing hardware may be used to implement software application 610.

For example, software application 610 stored in memory 604 can include instructions for monitoring available uptime, for displaying/presenting available uptime in graphical user interfaces, and/or other functionality. Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 108), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, software blocks 608 and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online server 102 are described as performing operations as described in some implementations herein, any suitable component or combination of components of online server 102, or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 500 and/or 520) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software.

Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to automatically monitor system health of a first computer system at a second computer system, the method comprising:
   determining a number of health check ping responses to a health check ping that are received from the first computer system during an allotted timeframe, wherein the health check ping is sent to the first computer system by a health supervisor subroutine executing on the second computer system;
   determining a number of non-error responses to a status check ping that are received from the first computer system during the allotted timeframe;
   aggregating the number of health check ping responses and the number of non-error responses to determine a number of active non-error periods associated with the first computer system;
   outputting a system health metric for the allotted timeframe based upon the number of active non-error periods;
   transmitting the system health metric to the second computer system; and
   displaying a graphical user interface (GUI) at the second computer system, accessible over a network by the first computer system, wherein the GUI displays the system health metric as associated with the first computer system, and wherein the GUI displays the system health metric as ratio of properly functioning system time and non-properly functioning system time of the first computing system.

2. The computer-implemented method of claim 1, further comprising issuing the health check ping to the first computer system at specific intervals for an evenly divisible number of sub-timeframes of the allotted timeframe.

3. The computer-implemented method of claim 2, wherein the active non-error periods are of a first size, and wherein the sub-timeframes are of a second size.

4. The computer-implemented method of claim 2, further comprising issuing a status check ping to the first computer system at specific intervals at least once per sub-timeframe.

5. The computer-implemented method of claim 1, wherein aggregating the number of health check ping responses and the number of non-error responses comprises:
   recording for a sub-timeframe of the allotted timeframe, each health check ping response and each non-error response; and
   separately summing a total number of health check ping responses and non-error responses.

6. The computer-implemented method of claim 5, wherein the system health metric is the quotient of the sum of the total number of health check ping responses and non-error responses, and a number of sub-timeframes within the allotted timeframe.

7. The computer-implemented method of claim 1, wherein outputting the system health metric comprises one or more of:
   outputting a percentage value of system availability that represents a ratio of properly functioning system time to total time in the allotted timeframe;
   outputting a color-gradient graphical interface element that includes a color element, wherein a color of the color element is selected based on the ratio of properly functioning system time to total time in the allotted timeframe; or
   outputting a binary value of the system health metric based on a threshold applied to the ratio.

8. The computer-implemented method of claim 7, wherein:
   wherein outputting the percentage value comprises providing a webpage that includes the percentage value;
   wherein outputting the color-gradient graphical interface element comprises displaying a status light of an updateable color; or
   wherein outputting the binary value comprises displaying a binary value or a specified color based on the threshold.

9. The computer-implemented method of claim 1, wherein the number of non-error responses is measured on the first computer system and periodically reported to the second computer system.

10. A system, comprising:
    a memory with instructions stored thereon; and
    a processing device, coupled to the memory, the processing device configured to access the memory, wherein the instructions when executed by the processing device, cause the processing device to perform operations including:
    determining a number of health check ping responses to a health check ping that are received from a first computer system during an allotted timeframe, wherein the health check ping is sent to the first computer system by a health supervisor subroutine executing on a second computer system;

determining a number of non-error responses to a status check ping that are received from the first computer system during the allotted timeframe;

aggregating the number of health check ping responses and the number of non-error responses to determine a number of active non-error periods associated with the computer system;

outputting a system health metric based upon the number of active non-error periods;

transmitting the system health metric to the second computer system; and displaying a graphical user interface (GUI) at the second computer system, accessible over a network by the first computer system, wherein the GUI displays the system health metric as associated with the first computer system, and wherein the GUI displays the system health metric as ratio of properly functioning system time and non-properly functioning system time of the first computing system.

11. The system of claim 10, wherein the operations further comprise issuing the health check ping to the first computer system at specific intervals for an evenly divisible number of sub-timeframes of the allotted timeframe.

12. The system of claim 11, wherein the active non-error periods are of a first size, and wherein the sub-timeframes are of a second size.

13. The system of claim 11, wherein the operations further comprise issuing a status check ping to the first computer system at specific intervals at least once per sub-timeframe.

14. The system of claim 10, wherein aggregating the number of health check ping responses and the number of error responses comprises:

recording for a sub-timeframe of the allotted timeframe, each health check ping response and each non-error response; and separately summing a total number of health check ping responses and non-error responses.

15. The system of claim 14, wherein the system health metric is the quotient of the sum of the total number of health check ping responses and non-error responses, and a number of sub-timeframes within the allotted timeframe.

16. A non-transitory computer-readable medium with instructions stored thereon that, responsive to execution by a processing device, causes the processing device to perform operations comprising:

determining a number of health check ping responses to a health check ping that are received from a first computer system during an allotted timeframe, wherein the health check ping is sent to the first computer system by a health supervisor subroutine executing on a second computer system;

determining a number of non-error responses to a status check ping that are received from the computer system during the allotted timeframe;

aggregating the number of health check ping responses and the number of non-error responses to determine a number of active non-error periods associated with the computer system;

outputting a system health metric for the allotted timeframe based upon the number of active non-error periods;

transmitting the system health metric to the second computer system; and displaying a graphical user interface (GUI) at the second computer system, accessible over a network by the first computer system, wherein the GUI displays the system health metric as associated with the first computer system, and wherein the GUI displays the system health metric as ratio of properly functioning system time and non-properly functioning system time of the first computing system.

17. The non-transitory computer-readable medium of claim 16, wherein the operations further comprise:

issuing the health check ping to the first computer system at specific intervals for an evenly divisible number of sub-timeframes of the allotted timeframe; and issuing a status check ping to the first computer system at specific intervals at least once per sub-timeframe.

18. The non-transitory computer-readable medium of claim 17, wherein the active non-error periods are of a first size, and wherein the sub-timeframes are of a second size.

19. The non-transitory computer-readable medium of claim 16, wherein aggregating the number of health check ping responses and the number of non-error responses comprises:

recording for a sub-timeframe of the allotted timeframe, each health check ping response and each non-error response;

separately summing a total number of health check ping responses and non-error responses; and wherein the system health metric is the quotient of the sum of the total number of health check ping responses and non-error responses, and a number of sub-timeframes within the allotted timeframe.

* * * * *